United States Patent [19]

Osanami et al.

[11] Patent Number: 5,158,638
[45] Date of Patent: Oct. 27, 1992

[54] METHOD OF MAKING WINDOW GLASS WITH A GASKET

[75] Inventors: Kunio Osanami, Nagareyama; Shoji Atsuta; Hideyuki Hashimoto, both of Chita; Toshihiko Waki, Yokohama, all of Japan

[73] Assignee: Asahi Glass Company Ltd., Tokyo, Japan

[21] Appl. No.: 501,866

[22] Filed: Mar. 29, 1990

[30] Foreign Application Priority Data

| Mar. 31, 1989 | [JP] | Japan | 1-78584 |
| Mar. 31, 1989 | [JP] | Japan | 1-78585 |
| Mar. 31, 1989 | [JP] | Japan | 1-78587 |
| Mar. 31, 1989 | [JP] | Japan | 1078145 |

[51] Int. Cl.$^5$ .................. B29C 69/00; B29C 47/00
[52] U.S. Cl. .................... 156/245; 156/99; 156/108; 264/252
[58] Field of Search ........... 264/252, 318, DIG. 67; 156/108, 109, 245, 99

[56] References Cited

U.S. PATENT DOCUMENTS

| 2,223,346 | 12/1940 | Anderson | 264/318 |
| 2,733,789 | 2/1956 | Tolle | 156/109 |
| 2,982,997 | 5/1961 | Peickii et al. | 264/DIG. 67 |
| 4,626,185 | 12/1986 | Monnet | 264/252 |

FOREIGN PATENT DOCUMENTS

| 890747 | 4/1982 | Belgium |
| 0292364 | 11/1988 | European Pat. Off. |
| 0319262 | 6/1989 | European Pat. Off. |
| 2157189 | 5/1973 | France |
| 251229 | 11/1987 | Japan | 156/108 |
| 1080271 | 8/1967 | United Kingdom | 264/252 |

OTHER PUBLICATIONS

Patent Abstracts of Japan, vol. 13, No. 300, Jul. 11, 1989; JP-A-1 93 319.
Patent Abstracts of Japan, vol. 12, No. 274, Jul. 29, 1988; JP-A-63 57 213.
Patent Abstracts of Japan, vol. 13, No. 122, Mar. 27, 1989; JA-A-63 297 009.
Patent Abstracts of Japan, vol. 13, No. 247, Aug. 6, 1989 JP-A-15 005 212.

Primary Examiner—James Lowe
Attorney, Agent, or Firm—Oblon, Spivak, McClelland, Maier & Neustadt

[57] ABSTRACT

In molding a gasket on a window glass, a dummy member having a peripheral portion the shape of which is the same as the peripheral portion of a window glass which is intended to be provided with a gasket, is placed in a molding device having a gasket forming cavity. A gasket material is injected into the cavity formed at the peripheral portion of the dummy member and solidified. The dummy is removed from the molding device, after which the gasket is separated from the dummy member and attached to the peripheral portion of a window glass.

4 Claims, 6 Drawing Sheets

FIG. 7f / FIG. 7e / FIG. 7d 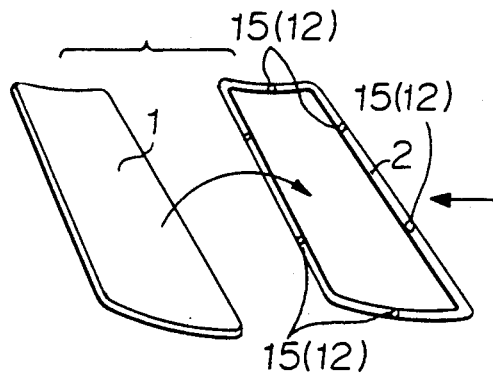 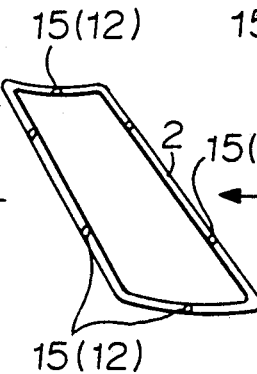 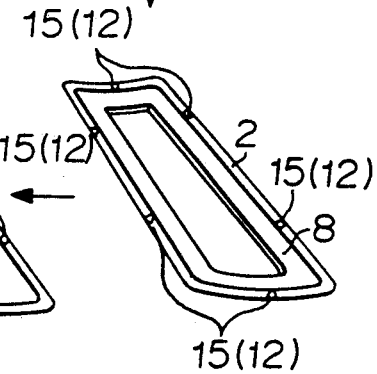

FIGURE 6
FIG.6a
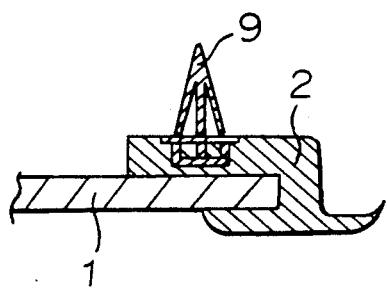
FIG.6b
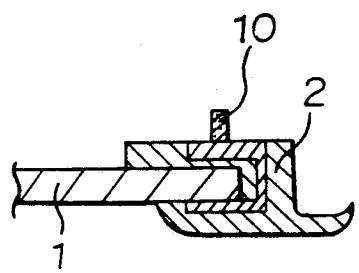
FIGURE 8
FIG.8a
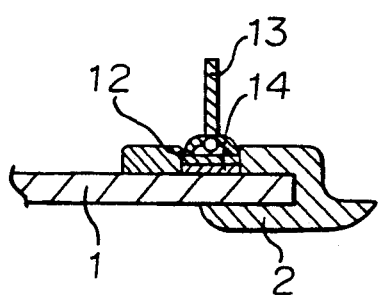
FIG.8b
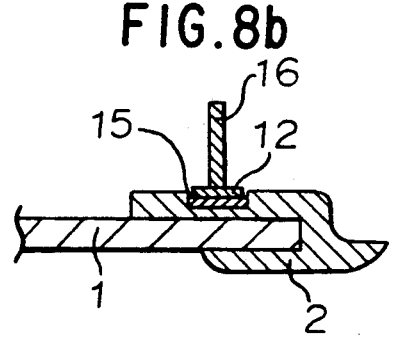

METHOD OF MAKING WINDOW GLASS WITH A GASKET

BACKGROUND OF THE INVENTION

The present invention relates to a method of making a window glass with a gasket suitable for automobiles and buildings. More particularly, the present invention relates to a method of making a window glass having a curved portion and provided with a gasket.

It has been known to attach a gasket, a molding or a frame member (hereinbelow, referred to simply as a gasket) made of a material of rubber or a synthetic resin for the purpose of decorative trim strip or a seal at a peripheral portion of a window glass for an automobile or a building. More specifically, a gasket 2 is attached to the peripheral portion of a window glass 1 as shown in FIGS. 3 and 4.

In order to attach the gasket to the window glass, it has been known to use a method in which a gasket prepared by an extruding method is attached or fitted to the peripheral portion of a window glass. However, this method has problems that wrinkles are resulted at a corner portion or it is difficult to attach the gasket to the window glass when the window glass has a complicated shape because the gasket is formed in a linear form and the linear gasket has to be bent along a curved portion of the window glass.

In order to solve the above-mentioned problems, there has been proposed a method of making a window glass with a gasket in such a manner that a window glass is disposed in molding dies, a gasket material such as a plastic, rubber or an elastomer in a molten state or a mixture of raw materials capable of forming a plastic, rubber or an elastomer is injected into the molding dies to fill the material in a cavity formed at the peripheral portion of the window glass received in the molding dies, and thereafter, the window glass with a gasket is removed from the dies. Such method is disclosed, for instance, in Japanese Unexamined Patent Publication Nos. 158481/1982, 73681/1983, 110786/1983, 4015/1985, 104412/1985, 63115/1985, 79613/1986 and 66645/1986.

In accordance with the above-mentioned method, the window glass is put in the molding dies having an upper mold member and a lower mold member. A gasket material is injected in a cavity formed around the peripheral portion of the window glass enclosed in the molding dies. When the gasket material is solidified in the dies, the molded frame member is removed from the dies together with the window glass. This method will be described in more detail with reference to drawings.

As shown in FIG. 1a, a window glass 1 is arranged in a mold 5 comprising a first mold section 3 and a second mold section 4 so that the window glass 1 is held by the first and second mold sections 3, 4 to thereby form an inner cavity 6 at the peripheral portion of the window, glass 1 (FIG. 1b). A gasket material such as a plastic, rubber or an elastomer which is in liquid state, a molten state or a mixture of raw material capable of forming a plastic, rubber or an elastomer is injected into the inner cavity 6 through a gate in mold portion 7. Thus, a gasket 2 is formed by the solidification of the gasket material in the inner cavity 6. Then, the window glass 1 attached with the gasket 2 is removed from the mold 5 by separating first and second mold sections 3, 4 as shown in FIG. 1c.

In the above-mentioned method, it is necessary to strongly clamp the window glass 1 by the first and second mold sections 3, 4 when the window glass 1 is held in the mold 5. Accordingly, there was a problem that the window glass 1 is apt to be broken due to a clamping force. This problem was particularly critical when a curved window glass 1 was to be handled. Namely, it is difficult to increase accuracy in the bending of the window glass 1, and it is unavoidable that there is dispersion in the dimensions of a curved window glass. Therefore, when the window glass 1 is clamped between the first and second mold sections 3, 4, a stress is applied to the window glass 1 to thereby cause the breakage of it. Recent years, a window glass having a sharply bent angle or having a complicated shape has been used for an automobile. The window glass having a curved portion is apt to be broken. Further, when broken, an economical loss is large. This is a reason why the above-mentioned method has not been applied. When a previously prepared gasket is fitted to a window glass having a curved portion, it is difficult to fit the both members because the shape of the gasket does not often meet with that of the window glass.

SUMMARY OF THE INVENTION

It is an object of the present invention to provide a method of making window glass with a gasket which allows the close-fitting of a gasket to the peripheral portion of a window glass when the gasket is to be fitted to a curved window glass and prevents the window glass from breaking.

The present invention is made to attain the above-mentioned object and to provide a method of making window glass and gasket assembly characterized by comprising preparing a dummy member having a peripheral portion of a certain shape which is the same as that of the peripheral portion of a window glass which is intended to be provided with a gasket, putting the dummy member in a shaping mold having a gasket forming cavity, injecting a gasket material into the cavity formed at the peripheral portion of the dummy member and solidifying the gasket material with the certain shape, removing from the mold the dummy member around which a gasket is formed, separating the gasket from the dummy member, and attaching the gasket to the peripheral portion of a window glass.

Hereinbelow, the method as described above is referred to as a dummy method.

It is an object of the present invention to further improve the above-mentioned method by the present invention and to provide a method of making window glass with a gasket which minimizes the breaking of it; allows the close-fitting of a gasket to a window glass having a desired shape, and facilitates to fit a window glass assembly with a gasket to a window frame for an automobile, a building or the like.

The above-mentioned object has been attained by providing a method of making a window glass and gasket assembly characterized by comprising putting a dummy member having a peripheral portion of a certain shape which is the same as that of the peripheral portion of a window glass which is intended to be provided with a gasket in a shaping mold, injecting a gasket material into a cavity formed at the peripheral portion of the dummy member and solidifying it with the certain shape so that a gasket having a shape corresponding to the shape of cavity is formed at the peripheral portion of the window glass, the gasket is separated from the dummy member and the gasket is fitted to the peripheral portion of a window glass, wherein the gasket material is injected in the cavity under such condition that a fitting piece such as a clip, a pin, a stud, a bolt of a nut or the like is arranged at the peripheral portion of the dummy member so that the window glass can be fitted to a structure, whereby the fitting piece is formed integrally with the gasket and the gasket to which the fitting member is formed integrally is fitted to the peripheral portion of the window glass.

In order to attain the above-mentioned object, there is provided the method of making window glass with a gasket described above, wherein a cavity or a recess for the fitting piece used for fitting a window glass assembly is provided at a portion of the gasket, the fitting piece is arranged at the cavity or the recess before or after the gasket is fitted to the window glass, and the fitting piece is bonded to the gasket and/or the window glass.

In the method of making window glass with a gasket described above, there often take place problems that when the gasket is fitted to the window glass and if an amount of an adhesive is small, the bonding can not be certainly done, and on the other hand, when a much amount of an adhesive is applied, the adhesive may squeeze out to thereby impair a beautiful appearance.

It is an object of the present invention to eliminate the above-mentioned problems and to provide a method of making window glass with a gasket which minimizes a possibility of the breaking of the window glass at the time of manufacturing; closely fits a window glass having a desired shape without difficulty; facilitates the coating of an adhesive to provide reliable adhesion, and provides a good appearance without causing the squeezing-out of the adhesive.

The above-mentioned object has been attained by providing a method of making a window glass and gasket assembly characterized by comprising putting a dummy member having a peripheral portion having a certain shape which is the same as that of the peripheral portion of a window glass which is intended to be provided with a gasket, in a shaping mold so that a cavity for forming a gasket is formed at the peripheral portion of the dummy member, injecting a gasket material into the cavity and solidifying it with the certain shape so that a gasket having a shape corresponding to the cavity is formed at the peripheral portion of the window glass, and the gasket is separated from the dummy member and it is fitted to the peripheral portion of the window glass, wherein a recess for adhesion is formed in the gasket at a portion which faces the window glass.

Further, it is an object of the present invention to further improve the dummy method described at first, and to provide a method of making window glass with a gasket which is provided with a fitting piece wherein the fitting piece is difficult to be detached from the position and is firmly attached.

The above-mentioned object has been attained by providing a method of making a window glass and gasket assembly characterized by comprising putting a dummy member having a peripheral portion with a certain shape which is the same as that of the peripheral portion of a window glass in a shaping mold which provides a cavity for forming a gasket at the peripheral portion of the window glass, injecting a gasket material into the cavity and solidifying it with the certain shape so that a gasket having a shape corresponding to that of the peripheral portion of the window glass is formed, the gasket is removed from the mold the dummy member around of which the gasket is formed, the gasket is separated from the dummy member, the gasket is attached to the peripheral portion of the window glass, and a fitting piece with a soft layer composed of a soft material is attached to the window glass, or the fitting piece is attached to the gasket by bonding or partially fuse-bonding the soft layer facing the surface of the window glass.

BRIEF DESCRIPTION OF THE DRAWINGS

In drawings:

FIGS. 6(a) and 6(b) are respectively enlarged cross-sectional views partly broken of an embodiment of each window glass with a gasket produced by the method of the present invention wherein FIG. 6(a) shows that a clip as a fitting piece is formed integrally with a gasket, and FIG. 6(b) shows that a stud bolt as a fitting piece is formed integrally with a gasket;

FIGS. 7(a) through 7(g) are diagrams illustrating manufacturing steps of another embodiment of the method of the present invention;

FIGS. 8(a) and 8(b) are respectively enlarged cross-sectional views partly broken of each window glass with a gasket produced by the method of the present invention wherein FIG. 8(a) shows that a fitting piece is bonded to a recess formed in a gasket and FIG. 8(b) shows that a fitting piece is bonded to a recess formed in a gasket;

DETAILED DESCRIPTION OF THE PREFERRED EMBODIMENTS

Figure 1A:
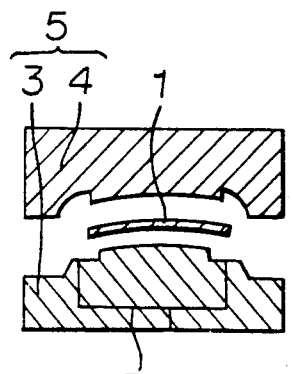
FIGS. 1(a), 1(b) and 1(c) are diagrams for illustrating an embodiment of manufacturing steps for a conventional method of making window glass with a gasket.
Figure 1B:
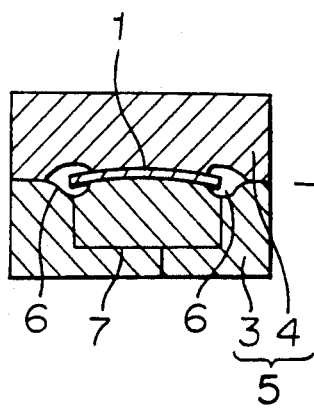
Figure 1C:
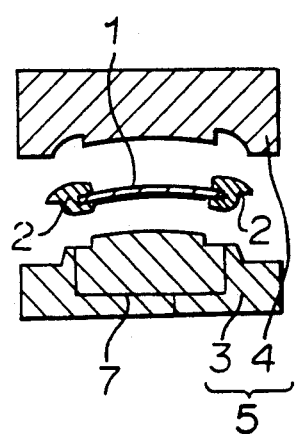
Figure 3:
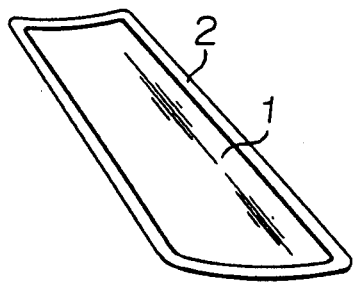
FIG. 3 is a perspective view showing a typical example of a window glass with a gasket.
Figure 4:
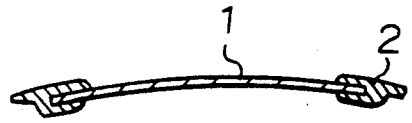
FIG. 4 is a cross-sectional view of the window glass shown in FIG. 3.

Preferred embodiments of the present invention will be described with reference to the drawings.

In the present invention, a dummy member 8 having a peripheral portion the shape of which is the same as that of the peripheral portion of a window glass as shown in FIGS. 1(a), 2(a), 5(a) and 7(a) is used. The dummy member 8 is composed of a material which is easily formed and durable to repeated use, e.g. a metal such as aluminium, stainless steel or the like. It is necessary that the shape of the peripheral portion of the dummy member 8 where a gasket 2 is to be formed is the same as that of a window glass 1. The shape of another portion may be determined as desired so long as the dummy member 8 can be placed in a shaping mold 5 having upper and lower parts or first and second mold sections. In this embodiment, the dummy member 8 is in a plate-like form and the central portion is hollowed to reduce weight. When a material having a high adhesive strength to the gasket 2 is used for the dummy member, it is preferable that a mold parting agent is previously coated on a surface of the dummy member 8 to which the gasket 2 contacts. It is naturally that the mold parting agent is coated on the inner surface of the mold 5, if required.

The dummy member 8 is arranged between the first mold section or the lower mold part 3 and the second mold section or the upper mold part 4 of the mold 5, and the dummy member 8 is fastened by the first and second mold sections 3, 4 as shown in FIGS. 1(b), 2(b), 5(b) and 7(b), whereby an inner cavity 6 is formed at the peripheral portion of the dummy member 8. Then, a gasket material is injected into the inner cavity 6 through a gate 7. When the gasket material is solidified, the gasket 2 is formed.

The gasket referred to in this description is a general name of a frame member, a gasket, a molding, a decorative trim strip or a member analogous to these which is fitted to a peripheral portion of a window glass for a window, an opening or a door for an automobile, a building or the like.

It is desirable that the gasket is made of a synthetic resin or a rubber or an elastomer. The gasket material injected into the shaping mold is preferably a melt of a synthetic resin, or a fluid synthetic resin material capable of forming a synthetic resin or a mixture of them when reacted in the mold. As the former, for instance, a molten soft vinyl chloride resin, a thermoplastic polyester elastomer, a styrene-diene thermoplastic elastomer, an ethylene-unsaturated carboxylic acid copolymer may be used. However, the gasket material is not limited to the above-mentioned materials. The synthetic resin obtained from the later mixture of materials includes, for example, a polyurethane elastomer, a polyurethane-urea elastomer, a polyurea elastomer, a polyamide resin, an epoxy resin, and an unsaturated polyester resin. However, the mixture of materials are not limited to the above. An ordinary injection molding method can be employed. It is preferable that a reaction injection molding is used for the later case.

Figure 2A:
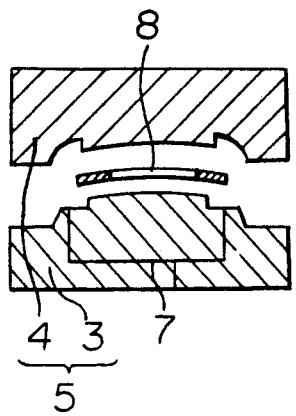
FIGS. 2(a), 2(b), 2(c), 2(d), 2(e), 2(f) and 2(g) are diagrams illustrating steps of an embodiment of the method of making window glass with a gasket in accordance with the present invention.
Figure 2B:
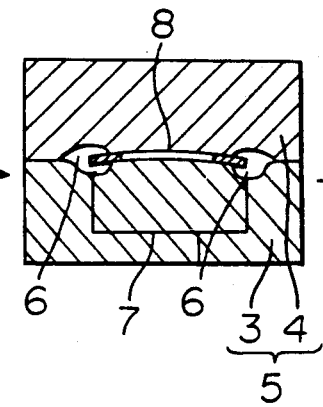
Figure 2C:
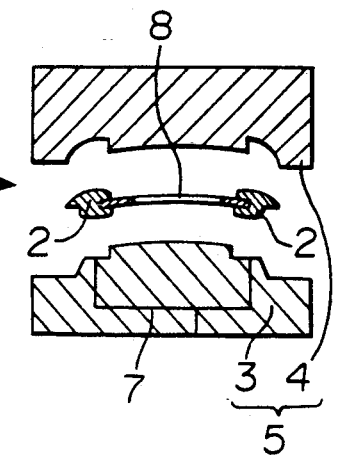
Figures 2D, 2E, 2F:
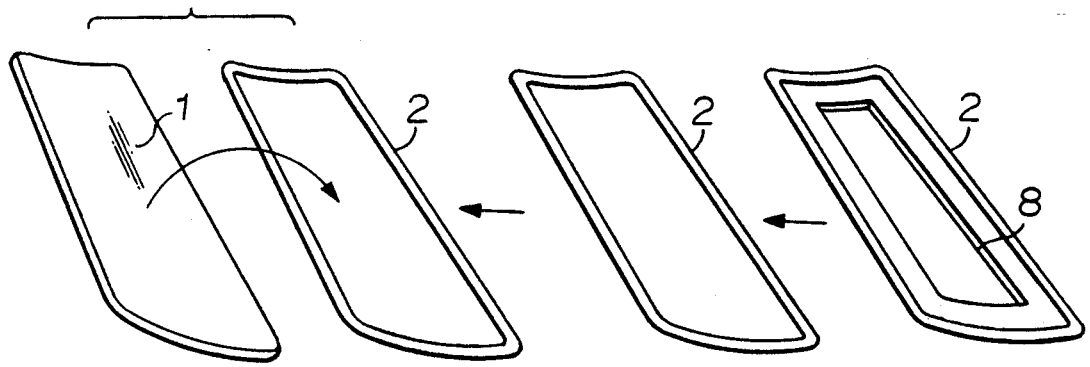
Figure 5A:
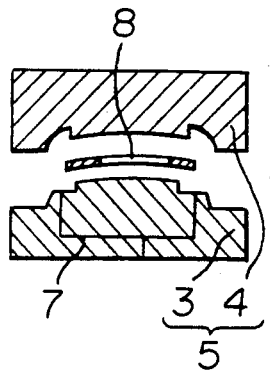
FIGS. 5(a) through 5(g) are diagrams for illustrating manufacturing steps of another embodiment of the method of the present invention.
Figure 5B:
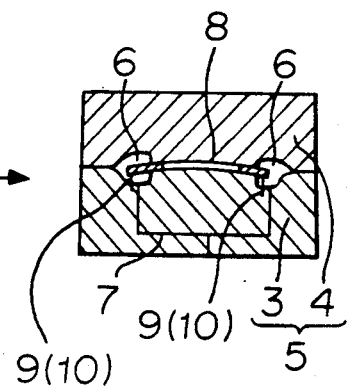
Figure 5C:
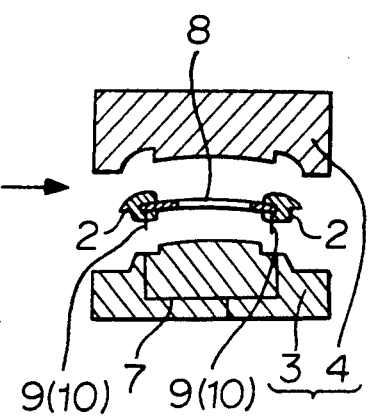
Figure 5F:
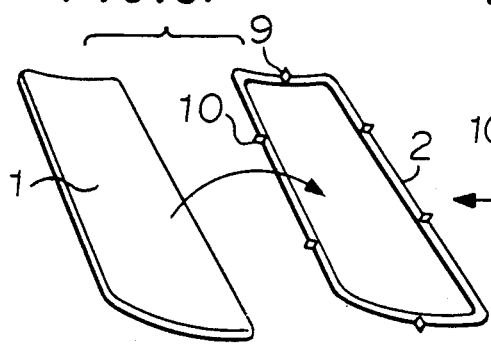

After the gasket 2 is formed at the peripheral portion of the dummy member 8, the dummy member attached with the gasket 2 is removed by separating the upper and lower mold parts 3, 4 as shown in FIGS. 1(c), 2(c), 5(c) and 7(c). As shown in FIGS. 2(d), 5(d) and 7(d), the gasket 2 is firmly attached to the peripheral portion of the dummy member 8 in that state.

Figure 5E:
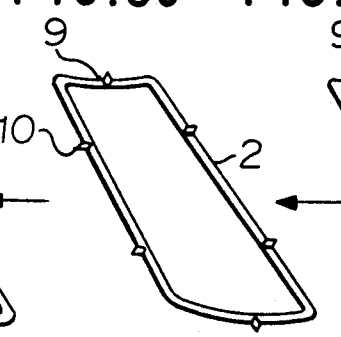
Figure 5D:
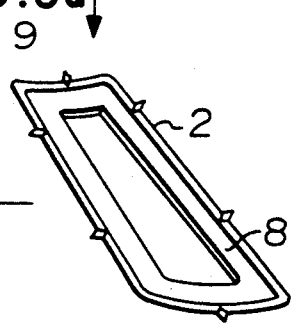

Then, the gasket 2 is separated from the dummy member 8 as shown in FIGS. 2(e), 5(e) and 7(e). The gasket 2 may be separated from the dummy member 8 while it keeps a form of ring by utilizing the elasticity of the gasket 2, or it may be separated by cutting a desired portion or portions of the gasket 2. However, it is desirable the gasket 2 is separated while it keeps a form of ring because there appears a joint portion in the gasket 2 to impair its outer appearance if a method of cutting the gasket is adopted when it is separated from the dummy member 8. In order to facilitates to separate the gasket 2 from the dummy member 8, the dummy member 8 may have such a structure that it is divided into several pieces or it is folded at several portions.

Figure 2G:
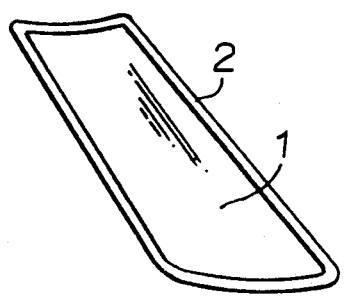
Figure 5G:
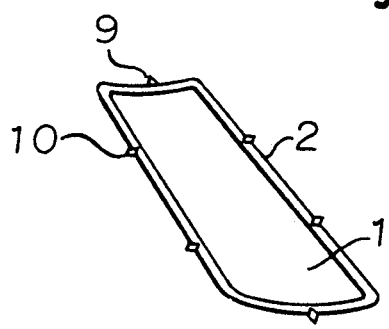
Figure 7A:
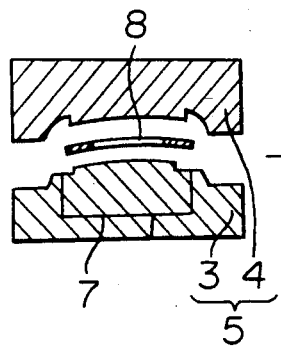
Figure 7B:
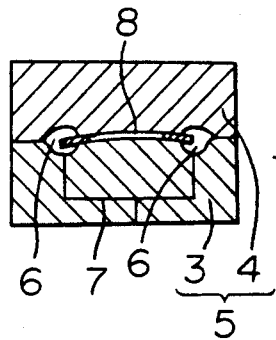
Figure 7C:
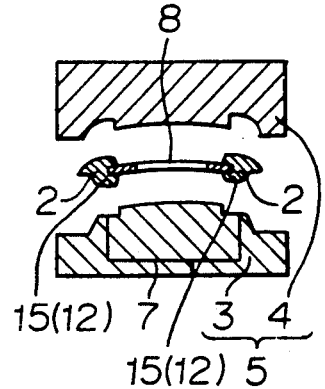
Figure 7G:
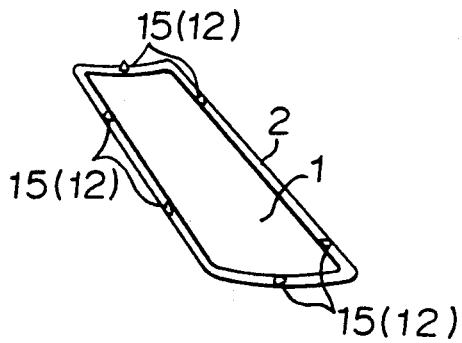

After the gasket 2 is separated from the dummy member 8, it is fitted to the peripheral portion of the window glass 1 as shown in FIGS. 2(f), 5(f) and 7(f). In this case, an adhesive may be applied to the contacting surface of the window glass 1 and/or the gasket 2 or a joint portion of the gasket 2 when the gasket 2 is separated by cutting. Since the gasket 2 is formed in conformity with the shape of the peripheral portion of the dummy member 8, it can be closely fitted to the peripheral portion of the window glass 1 as shown in FIGS. 2(g), 5(g) and 7(g). Accordingly, operations to fit can be easy and an excellent outer appearance is obtainable.

As described above, since the dummy member having the peripheral portion which has the same shape as that of the window glass is used, there is no danger that the window glass is broken due to a clamping force by the mold. Further, the gasket formed in conformity with the dummy member can be closely fit to the peripheral portion of the window glass when it is attached to the window glass. Accordingly, the breakage of the window glass is prevented even though the window glass has a curved portion, and the gasket can be closely fitted to the peripheral portion of the window glass having a curved portion.

Description will be made as to an embodiment of the method of making window glass with a gasket in accordance with the dummy method described before of the present invention wherein a fitting piece such as a clip, a stud bolt, a nut, a pin or a mold, or the like which is used for attaching the window glass assembly to a structure, is formed integrally with a gasket when it is formed, the gasket integrally attached with the fitting piece is fitted to the peripheral portion of a window glass to thereby form the window glass with a gasket which is integrally attached with the fitting piece.

FIG. 6(a) is an enlarged cross-sectional view partly broken of an embodiment of the window glass with a gasket obtained by the method of the present invention, wherein a reference numeral 1 designates a window glass, a numeral 2 designates a gasket, and a numeral 9 designates a clip as a fitting piece which is formed integrally with the gasket.

FIG. 6(b) shows another embodiment of the window glass with a gasket obtained by the method of the present invention, wherein a stud bolt 10 as a fitting piece is formed integrally with the gasket 2.

An embodiment of the method of making the window glass with a gasket in which the above-mentioned fitting piece is formed integrally will be described with reference to FIG. 5.

In the same manner as the method described with reference to FIG. 2, a dummy member 8 having a peripheral portion which has the same shape as the peripheral portion of the window glass 1 is prepared. A mold parting agent is previously coated at the surface of the peripheral portion of the dummy member 8 which contacts with a mold. The dummy member 8 is placed in the first and second mold sections 3, 4 of the mold as shown in FIG. 5(a). Then, the dummy member 8 is fastened by the first and second mold sections 3, 4 as shown in FIG. 5(b), whereby an inner cavity 6 is formed at the peripheral portion of the dummy member 8. The shape of the inner cavity 6 is so designed as to obtain a gasket having a desired shape. In the inner cavity 6, fitting pieces 9, 10 such as clips, pins, stud bolts or nuts which are used to attach an window glass assembly to an opening for window of an automobile or a building are previously arranged so that at least part of the fitting pieces is embedded in a gasket to be formed. The fitting pieces 9, 10 are respectively immovably placed at predetermined positions on the first mold section 3 or the second mold section 4 or the dummy member 8 so as not to move when a gasket material is injected. Then, the gasket material such as a melt of synthetic resin or a mixture of fluid synthetic resin materials capable of forming a synthetic resin when reacted in the mold is injected into the cavity 6 through a gate 7. When it solidifies, the gasket 2 is formed. In this case, since the fitting pieces 9, 10 are arranged in the cavity 6, at least part of the fitting pieces 9, 10 are embedded in the resin, whereby the fitting pieces are formed integrally with the gasket 2.

After the gasket 2 with the fitting pieces 9, 10 has been formed at the peripheral portion of the dummy member 8, the dummy member 8 is taken out together with the gasket 2 by separating the first and second mold sections 3, 4 of the mold 5 as shown in FIG. 5(c). Since, the gasket 2 is closely attached to the peripheral portion of the dummy member 8 as shown in FIG. 5(d), the gasket 2 is separated from the dummy member 8 as shown in FIG. 5(e). Then, the separated gasket 2 is fitted to the peripheral portion of the window glass 1 as shown in FIG. 5(f). Thus, the window glass having a gasket to which fitting pieces are integrally attached can be obtained.

In the window glass with a gasket obtained by the above-mentioned method of the present invention, excellent bonding between the fitting pieces and the gasket and between the fitting pieces and the window glass, depending on a structure, is obtainable since the fitting pieces are formed integrally with the gasket. Use of the fitting pieces extremely simplifies fitting operations to attach a window glass assembly to a structure such as an opening for window for an automobile or another vehicle or a building. Further, the fitting operations can be quickly and correctly done. Further, a window glass with a gasket which allows easy and reliable fitting to an automobile or a building can be provided.

Description will be made as to an embodiment of the method of making window glass with a gasket in accordance with the above-mentioned dummy method wherein a concave portion or a recess is formed in a gasket so as to receive a fitting piece such as a clip, a pin, a stud bolt or the like which is used to attach a window glass assembly to a structure and a synthetic resin is injected into an inner cavity formed in a mold.

FIG. 8(a) is an enlarged cross-sectional view of an embodiment of the window glass with a gasket obtained by the method of the present invention, wherein a reference numeral 1 designates a window glass, a numeral 2 designates a gasket and a numeral 12 designates a recess or a concave portion formed in the gasket, which is adapted to receive a stud bolt 13 which is bonded to both the window glass 1 and the gasket 2 with an adhesive 14.

FIG. 8(b) shows another embodiment of the window glass with a gasket obtained by the above-mentioned method of the present invention, wherein a recess 15 is formed in the gasket 2 with which a stud bolt 16 is formed integrally.

A method of making the window glass with a gasket in which a recess or a concave portion for receiving a fitting piece will be described with reference to FIG. 7.

A dummy member 8 having a peripheral portion which has the same shape as that of the peripheral portion of the window glass 1 is prepared in the same manner as the method described with reference to FIG. 2. A mold parting agent is previously applied on the surface of the dummy member 8 which contacts with at least the gasket. The dummy member 8 is arranged between the first and second mold members 3, 4 of the mold 5 as shown in FIG. 7(a). Then, the dummy member 8 is fastened by the first and second mold sections 3, 4 as shown in FIG. 7(b), whereby inner cavity 6 is formed at the peripheral portion of the dummy member 8. The shape of the inner cavity 6 is so designed as to form a frame structure having a desired shape and recesses and/or concave portions 12, 15 for receiving fitting pieces. Auxiliary shaping mold members may be arranged in the inner cavity 6 so as to form the recesses and/or concave portions 12, 15. The auxiliary shaping mold members are placed at predetermined positions of the first mold section 3, the second mold section 4 or the dummy member 8 so as not to be moved when a gasket material is injected in the inner cavity 6. As the gasket material, a melt of synthetic resin or a fluid synthetic resin material capable of forming a synthetic resin or a mixture of them when reacted in the shaping mold may be used. The gasket material is injected into the inner cavity 6, and the gasket 2 is formed by the solidification of the material. Since the auxiliary mold members are arranged in the inner cavity 6, the recess and/or the concave portions 12, 15 for receiving the fitting pieces are formed in the gasket 2. After the gasket 2 has been formed at the peripheral portion of the dummy member 8, the dummy member 8 is taken out together with the gasket 2 by separating the first and second mold sections of the shaping mold 5 as shown in FIG. 7(c). Since the gasket 2 is firmly attached to the peripheral portion of the dummy member 8 as shown in FIG. 7(d), the gasket 2 is removed from the dummy member 8 as shown in FIG. 7(e). Then, the removed gasket 2 is fitted to the peripheral portion of the window glass 1 as shown in FIG. 7(f).

Thus, in accordance with the method of this embodiment, the fitting pieces are fitted to the recesses and/or the concave portions which are previously formed in the gasket, and the fitting pieces are bonded to the gasket and/or the window glass in one piece. Accordingly, this method is advantageous that the inner cavity in the shaping mold can be easily and correctly formed in comparison with a method of making window glass with a gasket wherein a gasket with fitting pieces is originally formed in one piece. Further, the fitting pieces can be easily attached to the gasket or the window glass and positions to fit the fitting pieces can be accurate. The method of this embodiment provides a simple shape of the inner cavity and there is no danger of the shifting of the fitting pieces in comparison with a method that fitting pieces are arranged in the cavity and they are integrally formed together with the gasket. Thus, in accordance with the above-mentioned method, a window glass with a gasket which allows fitting of a window glass assembly easily and correctly to an automobile or a building can be provided.

As shown in FIGS. 8(a) and 8(b), a window glass with a gasket with which a fitting piece is integrally formed can be obtained by fitting the fitting piece in a recess such as a hole 12 or a concave portion 15 formed in the gasket 2 and the fitting piece is bonded to the gasket and/or the window glass with an adhesive. As the adhesive, a generally known adhesive used to bond a metal such as the fitting piece to a resinous material or glass may be used. Since the fitting piece is formed integrally with the gasket for a window glass of the present invention, it is very simple, reliable and easy to fit a window glass assembly to a structure.

Description will be made as to another embodiment of the method of making window glass with a gasket in accordance with the dummy method of the present invention wherein a gasket is formed so that a recess for receiving an adhesive is formed in the gasket at a portion facing the peripheral portion of the window glass.

Figure 9A:
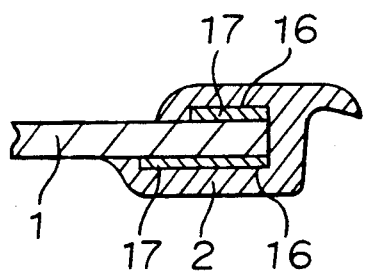
FIGS. 9(a) and 9(b) are respectively enlarged cross-sectional views partly broken of each window glass with a gasket produced by the method of the present invention.

FIGS. 9(a) is an enlarged cross-sectional view partly broken of an embodiment of the window glass with a gasket obtained by the method of the present invention, wherein a reference numeral 1 designates a window glass, a numeral 2 designates a gasket, a numeral 16 designates a recess for receiving an adhesive, which is formed in the gasket and a numeral 17 designates adhesive layers.

Figure 9B:
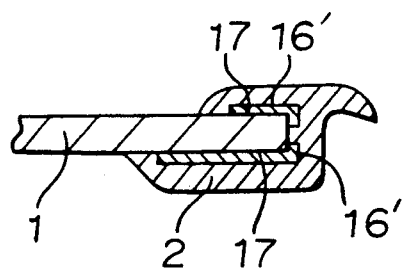
Figure 10:
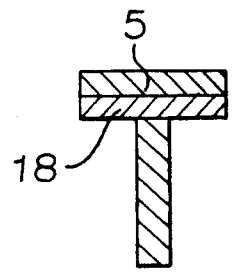
FIG. 10 is a longitudinal cross-sectional view of a stud bolt with a soft material as a fitting piece used for a window glass with a gasket which is produced by the method of the present invention.

FIG. 9(b) shows another embodiment of the window glass with a gasket obtained by the above-mentioned method of the present invention, wherein a recess 16' for receiving an adhesive is formed in the gasket 2.

The window glass with a gasket in which the recess 16 or 16' for receiving an adhesive is formed can be prepared in the same manner as the method described with reference to FIG. 2.

In forming a gasket having a desired shape in which a recess for an adhesive having a desired shape is formed, an inner cavity 6 is formed by suitably designing the shape of the peripheral portion of the dummy member, or by arranging an auxiliary mold member at a peripheral portion of the dummy member 8, or by suitably designing the shape or shapes of the first mold section and/or the second mold section. A gasket material such as a melt of synthetic resin or a mixture of fluid synthetic resin materials capable of forming a synthetic resin when reacted in the mold is injected in the inner cavity 6 through a gate 7, whereby the gasket 2 is formed by the solidification of the injected material. Then, the dummy member 8 is taken out together with the gasket 2 by separating the first and second mold sections of the mold thus, the gasket 2 having the concave portions 16, 16' for receiving an adhesive at portions facing the window glass is obtainable.

Thus formed gasket 2 is fitted to the peripheral portion of the window glass 1 while an adhesive is previously applied to the peripheral portion. Then, the gasket 2 is firmly bonded to the peripheral portion of the window glass 1 after the adhesive has cured. The recess 16 or 16' serves as a reservoir for the adhesive layer 17 itself or for an excessive amount of the adhesive. Accordingly, the possible breakage of the window glass having a curved portion can be prevented, and the gasket can be fittingly attached to the peripheral portion of the curved window glass. Further, since the recess for receiving an adhesive is formed in the gasket, the gasket can be bonded to the window glass with a sufficient amount of adhesive. The coating of the adhesive can be easy and the recess can serve as a reservoir for an excessive amount of adhesive, whereby the squeezing out of the adhesive can be prevented to thereby improve an adhesion strength, and good outer appearance can be maintained.

Description will be made as to an embodiment of the method of making window glass with a gasket in accordance with the above-mentioned dummy method of the present invention, the window glass with a gasket being so constructed that a fitting piece is fitted to a window glass or a gasket formed at the peripheral portion of the window glass, wherein a layer of a soft material is formed at a portion of the fitting piece facing the window glass, and the fitting piece is bonded to or melt-bonded to the window glass or the gasket through the soft material at the peripheral portion of the window glass.

FIGS. 10 through 13 are cross-sectional views showing embodiments of the window glass with a gasket obtained by the method of the present invention and diagrams illustrating the bonding of the fitting piece.

Figure 12:
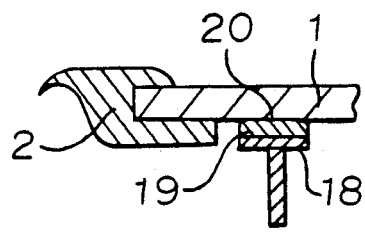
FIG. 12 is a cross-sectional view partly broken of an window glass with a gasket wherein a stud bolt as a fitting piece which provided with a soft material at the upper and lower portions of the head portion of the bolt is attached to the window glass.
Figure 13:
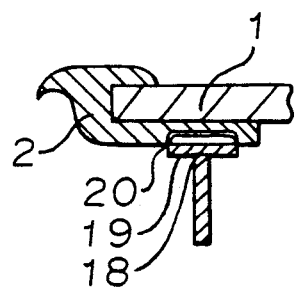
FIG. 13 is a cross-sectional view of a window glass with a gasket wherein the stud bolt as shown in FIG. 10 is bonded to or melt-bonded to the gasket which is fitted to the peripheral portion of the window glass.

As shown in FIG. 12, a layer 19 composed of a soft material such as a soft vinyl chloride is provided at a portion of a fitting piece 18 (a stud bolt in this embodiment) facing the window glass 1. The fitting piece 18 attached with the soft material layer 19 is bonded to the window glass 1 with an adhesive 20 through a soft material layer 18 as shown in FIG. 12. Or, the fitting piece 18 is bonded to a gasket 2 formed at the peripheral portion of the window glass 1 as shown in FIG. 13. In this embodiment, a recess for receiving the fitting piece such as a stud bolt is formed in the gasket 2 and the stud bolt is bonded to the recess.

Figure 11:
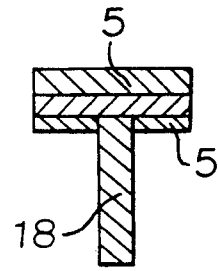
FIG. 11 is a longitudinal cross-sectional view of the stud bolt as shown in FIG. 10 wherein it is bonded to a window glass by an adhesive or it is melt-bonded to the window glass.

FIG. 11 shows another embodiment of the window glass with a gasket formed by the method of the present invention, wherein the soft material layer 18 is provided on the fitting piece such as stud bolt at the position which does not face the window glass. In the present invention, the head of the stud bolt may be entirely covered by the soft material layer 18. Or only the surface contacting with the window glass or the gasket may be covered by the soft material layer 18. However, the above mentioned structure is omitted in the drawings.

An adhesive is used in the above-mentioned embodiments. However, a melt-bonding method wherein a soft synthetic resin layer is heated to melt-bond may be used instead of using the adhesive.

As the above-mentioned soft material layer, a soft thermoplastic resin such as soft vinyl chloride resin, polyurethane or a rubber series elastomer may be used. In forming the soft material layer, a sheet-like material is applied to the surface of the window glass. The adhesive may be interposed at the contacting surface if necessary.

The thickness of the soft material layer is determined depending on the purpose of use of products.

When the adhesive is used for the present invention, an adhesive having good bonding strength to glass and metal, for instance, polyurethane series adhesive or silicon resin series adhesive may be used.

In using the soft synthetic resin for melt-bonding, an adhesive having good adhesive properties to the window glass and the fitting piece, such as a soft synthetic resin capable of melt-bonding by heat of a polyester series or an ethylene-vinyl acetate resin may be used. A plate-like soft synthetic resin having a suitably adjusted thickness is interposed between the soft material layer and the window glass or the gasket, and the sandwiched body is heated to thereby bonding the fitting piece to the window glass or the gasket.

For the one-piece forming method for the gasket 2, the dummy method wherein a dummy member is used for a window glass which is described with reference to FIG. 2 permits the gasket fittingly attached to the window glass having a curved portion. Further, the dummy method reduces a possibility of the breaking of glass during manufacturing steps and provides an advantage from the economical viewpoint.

In the above-mentioned structure, since the bonding or the melt-bonding of the fitting piece to the window glass or the gasket attached to the peripheral portion of the window glass interposing the soft material layer, the soft material absorbs vibrations or a shock to prevent the fitting piece from deviating or peeling-off even though the vibrations or the shock are applied to the window glass, whereby the bonding strength can be further improved.

In the present invention, various kinds of glass may be used for the window glass 1. For instance, as a single glass sheet, a laminated glass sheet having an interlayer, such as one obtained by laminating two glass sheets with an interlayer such as polyvinyl butyral, or bi-layered glass in which a polyurethane film or a polyester film is laminated on a surface of a single glass sheet or a laminated glass sheet, or a double-layered glass comprising two glass sheets laminated with a gap therebetween and the peripheral portion sealed in which dried air or nitrogen gas is filled, may be used. The glass sheets may be strengthened by a heat treatment, a chemical treatment or an air-cooling treatment. Further, these glass sheets may be flat glass sheets or processed glass sheets. The processed glass sheets may be a front, a side, a rear, a door or a sunroof window glass for automobiles, or glass sheets for buildings or another use. The gasket prepared by the method of the present invention can be closely fitted to a molded glass sheet such as a glass sheet having uneven surfaces.

Further, the gasket produced by the method of the present invention is applicable to a window glass whose surface is subjected to various types of treatment. For instance, it is applicable to a ceramic-coated glass sheet or a heat radiation reflecting glass sheet. Further, it is applicable to a glass sheet subjected to a treatment suitable for forming a gasket, for instance, a glass sheet coated with a primer at its peripheral portion where a gasket is fitted in order to improve a bonding strength to the gasket, a glass sheet coated with a protective paint or bonded with a detachable film on its portion where there is no gasket so that the paint or film can be removed after the gasket is fitted, or a glass sheet coated with a paint which is converted to an elastic body having sealing properties or bonded with an elastic body having sealing properties at the boundary portion between the portion where a gasket is formed and the portion where there is no gasket.

The present invention is applicable to various types of window glass with a gasket which are usable for automobiles, buildings or other structures.

As described above, in accordance with the present invention, a dummy member is disposed in a mold; a gasket is formed by injection molding, and the gasket is removed from the dummy member and fitted to a window glass. Accordingly, the breakage of the window glass can be prevented, and the gasket can be completely fitted to the peripheral portion of the window glass. Even though there is failure in molding a gasket, a window glass which is relatively expensive does not become useless.

We claim:

1. A method of making a window glass and gasket assembly comprising the steps of:
   preparing a dummy member having a peripheral portion of a certain shape which is the same as that of the peripheral portion of a window glass which is to be provided with a gasket,
   putting the dummy member in a shaping mold having a gasket forming cavity,
   injecting a gasket material into the cavity formed at the peripheral portion of the dummy member and solidifying the gasket material with said certain shape,
   removing from the mold the dummy member around which a gasket is formed, said gasket having a recess at a portion thereof facing the dummy member,
   attaching the gasket to the peripheral portion of the window glass with an adhesive applied between the window glass and the gasket.

2. The method according to claim 1, wherein a fitting piece adapted to attach a window glass assembly to a structure is previously arranged adjacent the peripheral portion of the dummy member and the gasket material is injected in the cavity, whereby a one piece body of the gasket and the fitting piece is formed.

3. The method according to claim 1, wherein a recess for receiving a fitting piece for attaching the window glass to a structure is formed in at least a part of the gasket.

4. The method according to claim 1, wherein a recess for receiving a fitting piece for attaching the window glass to a structure is formed in at least a part of the gasket, followed by bonding the fitting piece to one of the gasket and the window glass together with the gasket.

* * * * *